Jan. 15, 1957 W. B. BRUENE 2,777,996
IMPEDANCE MATCHING DEVICE
Filed Dec. 23, 1954
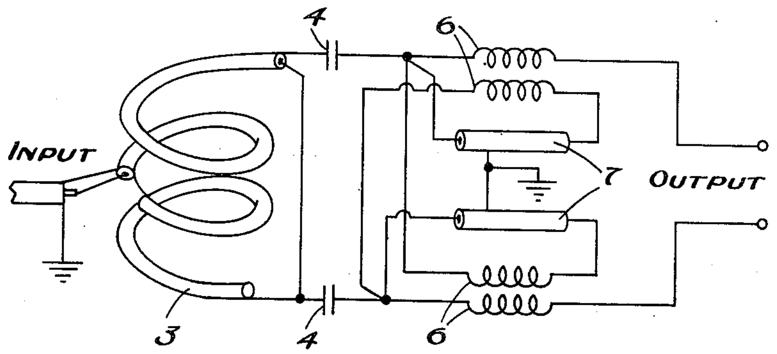
INVENTOR.
WARREN B. BRUENE
BY [signature]
ATTORNEY

United States Patent Office 2,777,996

Patented Jan. 15, 1957

2,777,996

IMPEDANCE MATCHING DEVICE

Warren B. Bruene, Cedar Rapids, Iowa, assignor to Collins Radio Company, Cedar Rapids, Iowa, a corporation of Iowa Application December 23, 1954, Serial No. 477,334

2 Claims. (Cl. 333—26)

This invention relates to impedance matching devices and more particularly to such devices for matching the impedance of a coaxial line to the impedance of an open wire transmission line.

Impedance transformation in high frequency circuits is necessary to match the line impedance to the load impedance in order to obtain the greatest energy output. There are many impedance matching devices, but most of them are not efficient over a multi-frequency range. This invention provides a broad band impedance matching device which is novel and which provides adequate impedance matching with not variables to obtain the greatest energy output possible.

It is an object of this invention to provide a broad band impedance matching device which is effective over a frequency ratio of 15 to 1. It is a further object of this invention to provide a broad band impedance matching device which is simple in construction and economical.

It is a still further object of this invention to provide an efficient impedance matching device over a broad frequency band with no variable elements or switching of elements, that is, the energy transmission is efficient at any frequency in the band. This and other objects of this invention will become apparent when the following description is read in conjunction with the drawing in which the single figure depicts this invention.

This invention has input and output leads as shown in the figure. However, the positioning of these leads may be reversed if it is desired to feed power in at the high impedance side of the invention and take the power out at the low impedance side of the invention. This invention is a means of matching a low impedance coaxial transmission line to a high impedance open wire transmission line. The values which may be used with this invention are a nominal 52 ohm input line to a nominal 600 ohm output transmission line. The frequency range which the illustrated embodiment of this invention covers is 2 to 30 megacycles.

This invention utilizes a number of coiled transmission lines to gives the proper impedance transformation. The number of coiled transmission lines which are required is dependent upon the impedance transformation ratio which is to be realized. Thus, for a 52 to 600 ohm impedance transformation, it is approximately a 9 to 1 ratio and three coiled transmission lines should be utilized. If the impedance transformation is to be near a 4 to 1 ratio, two coils should be used, and if the impedance transformation is near a 16 to 1 ratio, four coils should be used.

One of these transmission lines is best replaced when using an odd number, e. g., the middle line of a three-pair transmission system, by a line of coaxial cables of the correct length. Thus if the outside pairs of transmission lines had an impedance of 150 ohms, two sections of coaxial line having 75 ohms impedance each would be used. This insertion of the coaxial lines eliminates resonances caused by coil inductance and distributed capacitance in the coiled lines. The coaxial cables referred to are shown as elements 7 in the figure. The coiled transmission lines are shown as elements 6 in the figure.

This impedance transmission is not balanced; i. e., if the coils are fed from an unbalanced source, the output will not be balanced. With an unbalanced feed, the output is not balanced in phase or magnitude. This invention provides a means which converts an unbalanced input to a balanced input to feed the inverting or impedance matching coils of this invention. The balance is obtained from a section of coaxial cable which may be coiled as shown by element 3 in the figure. The length of this coaxial cable should be chosen so as to be less than one-half a wave length on the highest operating frequency. The center conductor of one-half of the coiled coaxial line is not connected to anything and is thus rendered inoperable in this invention. When the length of the coaxial line becomes less than one-fourth of a wave length, the coaxial line will shunt its output with an inductive reactance. This results in a mismatch and the standing wave ratio of the input rises rapidly as the frequency becomes less.

The coiled transmission lines also have an equivalent shunt inductive reactance in the lower frequencies. These inductive reactances tend to limit the frequency range over which an impedance match is obtainable. To compensate for the shunt inductive reactance at the low frequency end of the band, two capacitors 4 are inserted between the coiled transmission lines and the balancing coaxial section. The proper capacitor values extend the low frequency down at least an octave.

A specific example of this invention is to form element 3 from approximately 16 feet of coaxial cable and make it so that there are approximately 3½ turns on each side of the input connections. Thus element 3 is connected to the elements 6 and 7 by two capacitors 4 of approximately 2,100 micro-microfarads each. The coil sections are constructed to have each coil section of approximately 160 ohms and about 12 microhenries. This impedance matching system will provide an impedance match wherein the standing wave ratio will not exceed 1.8 to 1 at any frequency between 2 and 30 megacycles.

It is also possible to wind the impedance coils so that the coiled transmission line impedance varies from one end to the other to obtain an additional impedance transformation but the additional matching is not considered sufficient to warrant this type of winding.

Although this invention has been described with respect to a particular embodiment thereof, it is not to be so limited, as changes and modifications may be made therein which are within the full intended scope of the invention as defined by the appended claims.

What I claim is:

1. An impedance-matching system comprising a coaxial transmission line, a length of coiled coaxial line less than one-half the wavelength of the highest operating frequency, said coaxial transmission line having its center conductor and outside conductor connected to the center conductor and outside conductor, respectively, and intermediate the ends of said coiled coaxial line, an impedance transformation means comprising a plurality of two conductor coiled transmission lines having a certain impedance and at least one pair of sections of coaxial cable having an impedance equal to the impedance of each of said coiled transmission lines, an open wire transmission line, a pair of capacitance elements, the first side of each capacitance element connected respectively to one end of the outside conductor of said coiled coaxial line, one end of the center conductor of said coiled coaxial line connected to the outside conductor of the opposite end of said coiled coaxial line, a first conductor of each coiled transmission line having its first end connected to the second side of one of said capacitance elements, respectively, one end of the center conductor of each of said sections of coaxial cable individually connected to the second side of said capacitance elements, the other end of said center conductors connected individually to one end of the second conductors of said coiled transmission lines, the other ends of said second conductors of each of said coiled transmission lines individually connected to the second side of the opposite capacitance element as the first end of its related first conductor and its related center conductor, the second ends of said first conductors of said coiled transmission lines individually connected to one side of the open wire transmission line whereby maximum power transfer is obtained through said impedance-matching system.

2. An impedance-matching system comprising a coaxial transmission line, a length of coiled coaxial line less than one-half the wavelength of the highest operating frequency and having the center conductor in one half of the coiled coaxial line rendered inoperative, said coaxial transmission line connected to said coiled coaxial line intermediate the ends of said coiled coaxial line by having the center conductor and outside conductor of said coaxial transmission line connected to the center conductor and outside conductor respectively of said coiled coaxial line, an impedance transformation means comprising a plurality of two conductor coiled transmission lines having a certain impedance and at least one pair of sections of coaxial cable having an impedance equal to the impedance of each of said coiled transmission lines, an open-wire transmission line, a pair of capacitance elements, the first side of each capacitance element connected respectively to one end of the outside conductor of said coiled coaxial line and having the center conductor of said coiled coaxial line connected to the outside conductor of the opposite end of the coiled coaxial line, a first conductor of each coiled transmission line having its first end connected to the second side of one of said capacitance elements respectively, one end of the center conductor of each of said sections of coaxial cable individually connected to the second side of said capacitance elements, the other end of said center conductors connected individually to one end of the second conductors of said coiled transmission lines, the other ends of said second conductors of each of said coiled transmission lines individually connected to the second side of the opposite capacitance element as the first end of its related first conductor and its related center conductor, the second ends of said first conductors of said coiled transmission lines individually connected to one side of the open wire transmission line whereby maximum power transfer is obtained through said impedance-matching system.

References Cited in the file of this patent

FOREIGN PATENTS

| | | |
|---|---|---|
| 885,620 | France | May 31, 1943 |
| 590,203 | Great Britain | July 10, 1947 |